(12) United States Patent
Gao et al.

(10) Patent No.: US 8,761,249 B2
(45) Date of Patent: Jun. 24, 2014

(54) METHOD AND APPARATUS FOR ENCODING VIDEO COLOR ENHANCEMENT DATA, AND METHOD AND APPARATUS FOR DECODING VIDEO COLOR ENHANCEMENT DATA

(75) Inventors: Yong Ying Gao, Beijing (CN); Yu Wen Wu, Beijing (CN); Ying Chen, Beijing (CN)

(73) Assignee: Thomson Licensing, Issy-les-Moulineaux (FR)

( * ) Notice: Subject to any disclaimer, the term of this patent is extended or adjusted under 35 U.S.C. 154(b) by 1222 days.

(21) Appl. No.: 12/309,335

(22) PCT Filed: Jul. 17, 2006

(86) PCT No.: PCT/CN2006/001699
§ 371 (c)(1),
(2), (4) Date: Jan. 14, 2009

(87) PCT Pub. No.: WO2008/019524
PCT Pub. Date: Feb. 21, 2008

(65) Prior Publication Data
US 2009/0285283 A1    Nov. 19, 2009

(51) Int. Cl.
*G06F 21/00* (2013.01)
(52) U.S. Cl.
USPC ............ 375/240.08; 375/E7.2; 382/166; 382/168
(58) Field of Classification Search
CPC ............. G06T 5/009; G06T 5/40; G06T 5/50
USPC ............ 375/240.1, 240.18, 240.24; 382/162, 382/166, 239
See application file for complete search history.

(56) References Cited

U.S. PATENT DOCUMENTS 4,857,993 A * 8/1989 Music et al. ............ 375/240.01
2005/0244065 A1 * 11/2005 Malvar et al. ................ 382/239
(Continued)

FOREIGN PATENT DOCUMENTS

CN     1447285      10/2003
CN     1764277 A    4/2006
(Continued)

OTHER PUBLICATIONS

"Spatial Scalability Within the H.264/AVC Scalable Video Coding Extension"; Segall et al; IEEE Transactions on Circuits and Systems for Video Technology, vol. 17, No. 9, Sep. 2007, p. 1121-1135.*

(Continued)

*Primary Examiner* — Jason Lee
(74) *Attorney, Agent, or Firm* — Myers Wolin LLC

(57) ABSTRACT

A highly accurate reproduction of visual intensity and contrast rather than the conventional 8-bit color depth is more and more used, motivating the development of an enhanced dynamic range called high bit-depth. A method for encoding a first, low bit-depth image of M bit RGB pixels and a second, high bit-depth video image of N bit RGB pixels, M<N, both having same spatial resolution, comprises generating a first transfer function based on color histograms of the first and the second video image, generating a second transfer function based on the first transfer function, applying the second transfer function to the first video image, wherein a transformed first video image is generated, calculating and encoding the residual, encoding the first video image and transmitting the encoded first video image, the second transfer function and the encoded difference.

13 Claims, 3 Drawing Sheets

(56) References Cited

U.S. PATENT DOCUMENTS

2005/0244071 A1* 11/2005 Zaharia et al. ............... 382/251
2005/0259729 A1  11/2005 Sun

FOREIGN PATENT DOCUMENTS

| EP | 1294198 | 3/2003 |
| EP | 1349394 | 10/2003 |
| JP | 2005-027168 | 1/2005 |
| WO | WO2007082562 | 7/2007 |

OTHER PUBLICATIONS

"Video Compression—From Concepts to the H.264/AVC Standard"; Sullivan et al; 2005, IEEE, Proceedings of the IEEE, vol. 93, No. 1, Jan. 2005; 14 pages.*

Search Report Dated Mar. 19, 2007.

* cited by examiner

METHOD AND APPARATUS FOR ENCODING VIDEO COLOR ENHANCEMENT DATA, AND METHOD AND APPARATUS FOR DECODING VIDEO COLOR ENHANCEMENT DATA

This application claims the benefit, under 35 U.S.C. §365 of International Application PCT/CN2006/001699, filed Jul. 17, 2006, which was published in accordance with PCT Article 21(2) on Feb. 21, 2008.

FIELD OF THE INVENTION

This invention relates to a method and an apparatus for encoding video color enhancement data. Further, the invention relates to a method and an apparatus for decoding video color enhancement data.

BACKGROUND

In recent years, highly accurate reproduction of visual intensity and contrast rather than the conventional 8-bit color depth is more and more used in many fields, such as medical imaging, high-quality video-enabled computer games and professional studio and home theatre related applications. This process motivates the development of an enhanced dynamic range, which is called high bit-depth herein, for the convenience of comparison with the conventional 8-bit color depth. On contrast to the fact that advances in electronic sensors, processors and storage devices have resulted in very high pixel resolutions for both capturing and display devices, the color capacities of digital imaging systems have evolved in a very slow pace. 8-bit color depth has been dominant for capturing and display devices since the first generation of digitalized visual contents emerged.

Color bit-depth scalability is potentially useful considering the fact that in a considerably long period in the future standard 8-bit and higher-bit digital imaging systems will simultaneously exist in consumer marketplaces. Different color bit-depths are of particular importance for example for terminal display devices during multimedia content deliveries.

SUMMARY OF THE INVENTION

The present invention provides methods and device for enabling video color space scalability. According to one aspect of the invention, a method and a device for encoding a color enhancement layer is provided, which is encoded differentially. Another aspect of the invention is a method and a device for decoding a video signal to obtain either a conventional color bit-depth image or an enhanced color bit-depth image.

In principle, the encoding aspect of the invention comprises the following steps: generating a transfer function, for example in the form of a look-up table (LUT), which is suitable for mapping input color values to output color values, both consisting of $2^M$ different colors, applying the transfer function to a first video picture with low or conventional color bit-depth, generating a difference picture or residual between the transferred video picture and a second video picture with higher color bit-depth (N bit, with N>M; but same spatial resolution as the first video picture) and encoding the residual. Then, the encoded first video picture, parameters of the transfer function (e.g. the LUT itself) and the encoded residual are transmitted to a receiver. The parameters of the transfer function may also be encoded. Further, the parameters of the transfer function are indicated as such.

The first and second images can be regarded as being a color base layer and a color enhancement layer, respectively.

In particular, the transfer function may be obtained by comparing color histograms of the first and the second video pictures, for which purpose the color histogram of the first picture, which has $2^M$ bins, is transformed into a "smoothed" color histogram with $2^N$ bins (N>M), and determining a transfer function from the smoothed histogram and the color enhancement layer histogram which defines a transfer between the values of the smoothed color histogram and the values of the color enhancement layer histogram. The described procedure is done separately for the basic display colors red, green and blue.

According to the decoding aspect of the invention, a method for decoding comprises extracting from a bit stream video data for a first and a second video image, and extracting color enhancement control data, furthermore decoding and reconstructing the first video image, wherein a reconstructed first video image is obtained having color pixel values with M bit each, and constructing from the color enhancement control data a mapping table that implements a transfer function. Then the mapping table is applied to each of the pixels of the reconstructed first video image, and the resulting transferred video image serves as prediction image which is then updated with the decoded second video image. The decoded second video image is a residual image, and the updating results in an enhanced video image which has pixel values with N bit each (N>M), and therefore a higher color space than the reconstructed first video image.

The above steps are performed separately for each of the basic video colors red, green and blue. Thus, a complete video signal may comprise for each picture an encoded low color-resolution image, and for each of these colors an encoded residual image and parameters of a transfer function, both for generating a higher color-resolution image. Advantageously, generating the transfer function and the residual image is performed on the R-G-B values of the raw video image, and is therefore independent from the further video encoding. Thus, the low color-resolution image can then be encoded using any conventional encoding, for example according to an MPEG or JVT standard (AVC, SVC etc.). Also on the decoding side the color enhancement is performed on top of the conventional decoding, and therefore independent from its encoding format.

Thus, devices with lower color bit-depth display capability (e.g. 8-bit displays) need only decode the color base layer having lower color bit-depth, while advanced devices with enhanced color bit-depth display capability (e.g. 12-bit displays) may decode also the color enhancement layer and the transfer tables for red, green and blue, and generate pictures with full color space utilization.

The invention is related to a new type of video scalability, namely color bit-depth scalability, and provides a color bit-depth prediction solution that can be applied in the inter-layer prediction of a color bit-depth scalable CODEC to improve the coding efficiency. The advantage of using a transfer function to generate a prediction image before generating a residual image is that the encoding is more efficient, because the prediction image matches the respective color enhancement layer image better. For example, a value for a particular green tone, which is described by an 8-bit value of $9A_{hex}$ in the color base layer, may map to sixteen different 12-bit color values in the color enhancement layer, from $9A0_{hex}$ to $9AF_{hex}$. While in one picture one of these sixteen values may dominate in the color enhancement layer, it may be another value in another picture. Thus, the invention enables optimized encoding of the color enhancement layer.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 the structure of color bit-depth scalable video coding and decoding.

DETAILED DESCRIPTION OF THE INVENTION

Figure 1:
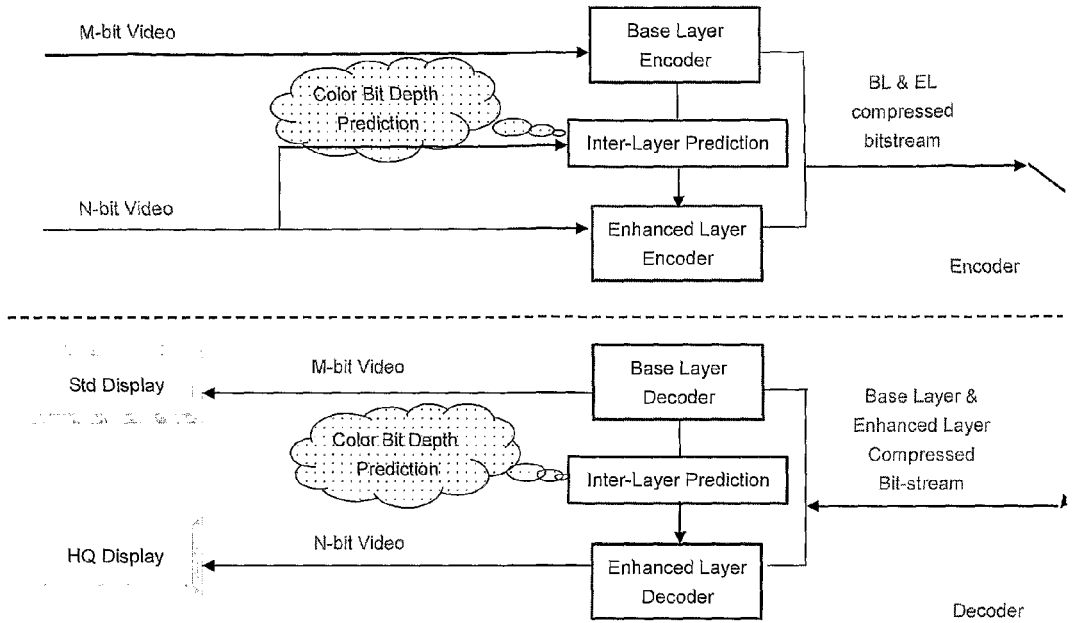

FIG. 1 shows the general structure of color bit-depth scalable video coding and decoding. The encoder ENC receives each video image twice, in conventional color resolution of M bit and in enhanced color resolution of N bit (N>M). Instead of generating two independent separate video streams, a color base layer and a color enhancement layer are generated, where the color enhancement layer is dependent on the color base layer. As shown in FIG. 1, an inter-layer prediction is performed in both the encoder and the decoder for predicting colors of higher bit-depth.

The base layer encoder block in FIG. 1 contains all the conventional encoding steps, for example any spatial and/or temporal redundancy reduction such as generating separate luminance and chrominance values, DCT transformations etc. On the decoder side, the base layer decoder performs the respective decoding. "base layer" and "enhancement layer" refer only to color bit-depth. Advantageously, any video encoding and decoding method can be used for the base layer, independent from the color enhancement process enabled by the invention. The output of a base layer decoder is suitable for a conventional display device, for example with M bit color resolution, while the output of an enhancement layer decoder is suitable for a high-quality display that is capable of displaying $2^N$ (N>M) different color values for each of the red, green and blue partial image. Examples for N are 10, 12 or 16 bits if M is e.g. 8, but in principle all combinations of M and N (N>M) can be implemented. Like other type of scalability, such as quality scalability, spatial scalability and temporal scalability, the inter-layer prediction impacts significantly the coding efficiency.

The present invention proposes a spatially uniform approach for color bit depth prediction based on smoothed histogram specification. Consider two images that describe the same scene. For the two images, the corresponding pixels (here the "corresponding pixels" mean two pixels that belong to the two images respectively but have the same coordinates in the image coordinate system) refer to the same scene location. The only difference between the corresponding pixels is the color bit depth. Assume each color of one image is encoded with code words of M bit length while the other image it is encoded with code words of N bit length, with M<N. The task of inverse tone mapping is to generate a predicted version of the N-bit image from the M-bit image, following the criterion that the difference between the predicted N-bit image and the original N-bit image is minimized. The difference between the predicted N-bit image and the original N-bit image may be measured by any method, for example PSNR, which is widely accepted and used in the field of video compression. Further, in this case the most important aspect is how effective the predicted image works for the following residual data compression, rather than how the predicted image looks.

Figure 2:
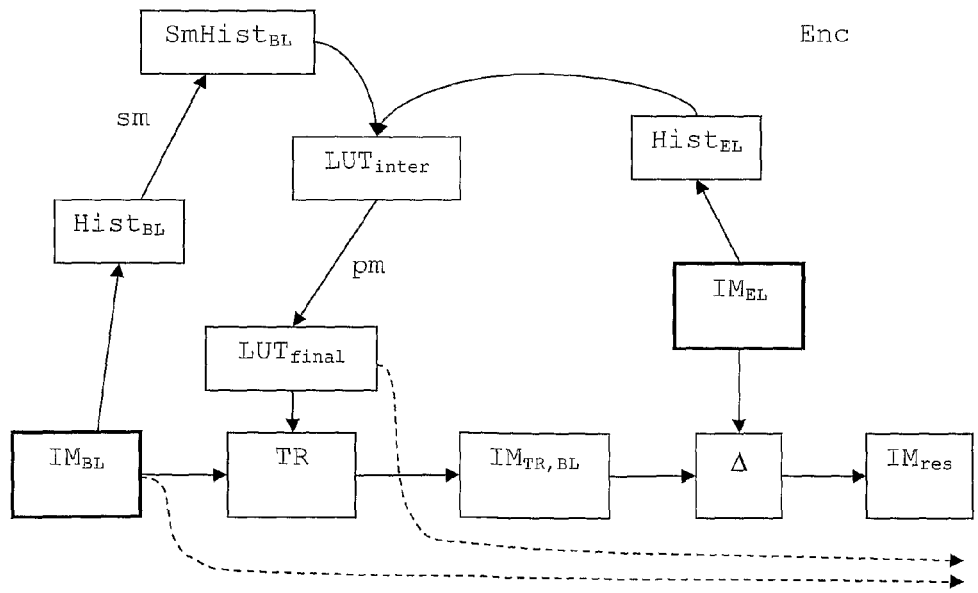
FIG. 2 a flow diagram of the encoding process.

FIG. 2 shows the general encoding procedure of one embodiment of the invention. A base layer image $IM_{BL}$ is transformed TR using a look-up table $LUT_{final}$ that implements a mapping function. The result of the transformation TR is a transformed base layer image $IM_{TR,BL}$. The look-up table $LUT_{final}$ is generated from another, intermediate look-up table $LUT_{inter}$, which is generated from color histograms of the base layer picture, preferably the reconstructed base layer picture, and of the enhancement layer picture. Due to the different color resolution of these pictures, their color histograms have not only a different amount of bins (one for each possible color), but the distribution of the values among the bins of the enhancement layer picture may be different for each base layer color, and for each picture of a sequence. If for example the base layer has M bit and the enhancement layer has N bit, each bin of the base layer histogram corresponds to $2^{N-M}$ bins of the enhancement layer histogram, i.e. each base layer pixel value would conventionally serve to predict one out of $2^{N-M}$ pixel values. This prediction is optimized by considering the color histograms of the two pictures. The intermediate look-up table $LUT_{inter}$ implements a histogram transformation function describing a transformation between the color histogram $Hist_{EL}$ of the enhancement layer picture and a color histogram $SmHist_{BL}$ generated from the base layer picture $IM_{BL}$, as described below.

The transformed base layer picture $IM_{TR,BL}$ is used to predict the enhancement layer picture $IM_{EL}$, and the difference or residual Δ is calculated, encoded $IM_{res}$ and transmitted. All these processes are separate for R, G and B.

Figure 3:
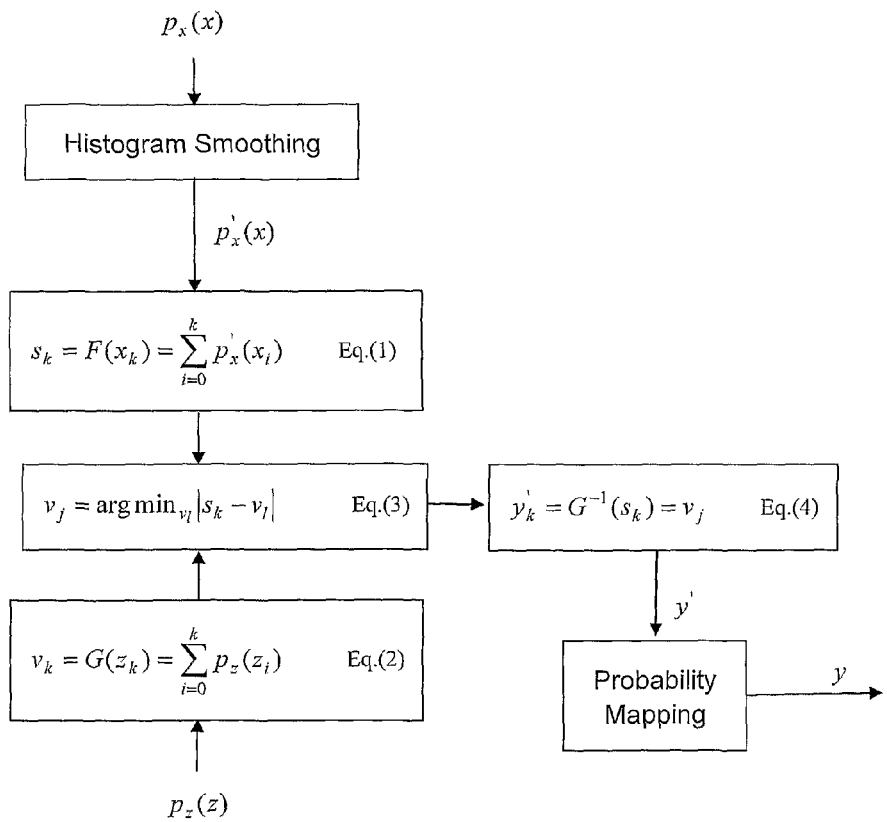
FIG. 3 a flow diagram of smoothed histogram specification.

FIG. 3 shows details of the proposed spatially uniform inverse tone mapping. For better understanding, the base layer (M-bit) image is named "input image" NI while the enhancement layer (N-bit) image is renamed "desired image" DI. One basic idea is to apply the algorithm of histogram specification[1] to NI and DI. A lookup table is generated to convert NI such that it has a particular histogram, as specified by the histogram of DI.

[1] R. C. Gonzalez and R. E. Woods, "Digital image processing", 2nd edition, pp. 94-102, Prentice Hall, 2002.

However, there are two major drawbacks when employing the classical histogram specification for color bit depth prediction. First, because the histograms have discrete values, the converted NI does not have exactly the same histogram as DI. Instead, the histogram of the converted NI is an approximation to that of DI. Second, the different bin size of the two histograms (caused by the different bit depth) deteriorates the matching between them (bin size means the number of the levels of each color component e.g. the bin size of 8-bit images is 256). This is a particular drawback in the considered color bit depth prediction. For instance, in the case that NI is simply bit-shift from DI, the PSNR of the converted NI which was obtained by histogram specification can often be lower than that obtained by simple inverse bit-shift.

To overcome these drawbacks, we propose to "smooth" the histogram of NI before it is specified. The smoothed histogram $SmHist_{BL}$ is of the same bin size as the histogram $Hist_{EL}$ of DI, which serves as the desired histogram for the process of histogram specification. The classical histogram specification algorithm is applied on the smoothed histogram and the desired histogram. Finally, a post processing called "Probability mapping" is carried out to obtain the LUT. The flowchart of the smoothed histogram specification is shown in FIG. 3. $p_x(x_k)$, k=0, 1, . . . , $2^M-1$ represents the histogram of NI $Hist_{BL}$, and the histogram of DI $Hist_{EL}$ is described by $p_z(z_k)$, k=0, 1, . . . , $2^N-1$.

In FIG. 3, for the low-bit (M-bit) image NI, the histogram of one color channel is $p_x(x)$. The histogram is smoothed by using eq. (5), and a smoothed histogram $p_x'(x)$ results, which has the same bin size as the histogram of the high-bit (N-bit) image DI does. The values are accumulated, resulting in $s_k$ (k=1, . . . , 16 for the example of FIG. 3). It can be expressed as a function $F(x_k')$.

The high-bit (N-bit) image DI has the histogram $p_z(z)$ of the same color channel, which is accumulated to result in $v_k$ (same k as above). It can be expressed as a function $G(z_k)$. Then the distribution $v_j$ is determined, which gives for each value of $s_k$ the best-matching value $v_l$ (from the $v_k$ values of the high-bit image DI). This distribution $v_j$ sets up a transformation from the values $s_k$ (therefore $x_k'$) to the values $v_k$, and it is the inverse of the transform G.

In the following, the process of histogram smoothing is described. The goal of histogram smoothing is to "stretch" the input histogram so that it will have the same bin size as the desired histogram. This is a prerequisite for the histogram specification process. Following the denotations in FIG. 3, the value of $p_x(x_k)$ is uniformly distributed into a corresponding range of $[x_k', x_k'+1, \ldots, x_k'+2^{(N-M)}-1]$, as described in eq. (5):

$$p_x'(x_k'+n) = \lfloor p_x(x_k)/2^{(N-M)} \rfloor + \begin{Bmatrix} 1, & \text{if } n \leq p_x(x_k) \% 2^{(N-M)} \\ 0, & \text{otherwise} \end{Bmatrix}, \quad (5)$$

$$n = 0, 1, \ldots, 2^{(N-M)} - 1$$

Figure 4:
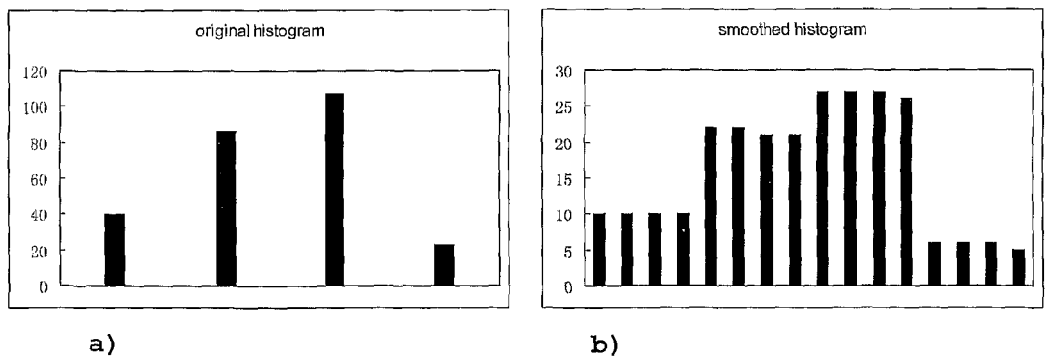
FIG. 4 an example of histogram smoothing.
Figure 5:
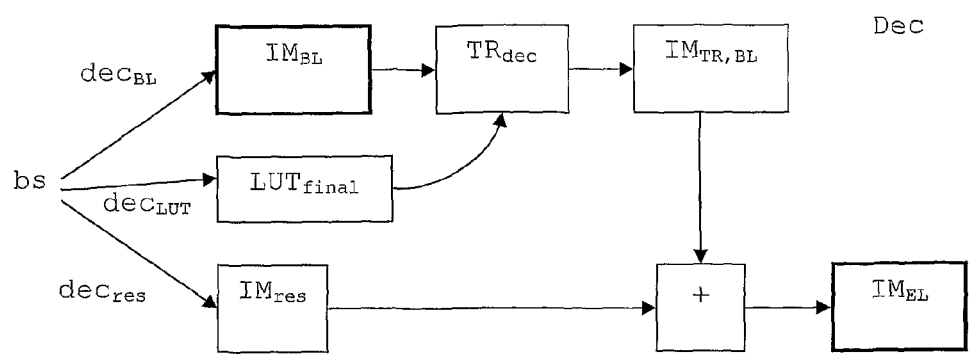
FIG. 5 a flow diagram of the decoding process.

To ensure "uniform distribution", un-normalized histograms are used. A simple example of a smoothed histogram is shown in FIG. 4. FIG. 4 a) shows a color histogram of a base layer input picture with a color bit depth of 2 bit, i.e. $2^2=4$ possible color values of a particular color, e.g. red. The histogram smoothing process "stretches" the histogram to a color bit depth of 4 bit, i.e. $2^4=16$ possible color values. The number of values in a single bin of the input picture is the number of pixels within the input picture that have this particular color value. E.g. a value of 40 in the left-most bin corresponding to the value 0 means that 40 pixels of the input picture have a "red" value of 0 (in this histogram refers to the color "red"). The smoothing process distributes these values to $2^{N-M}$ corresponding bins of the smoothed histogram. In this example with $2^{N-M}=4$ the first four bins of the smoothed histogram correspond to the first bin of the original histogram. According to eq. (5), the 40 values of the original histogram are evenly distributed to the four corresponding bins of the smoothed histogram, as shown in FIG. 4 b).

The idea behind the smoothing is that it improves the continuity of the input histogram, so that the histogram specification will be more efficient. In detail, we write down the alternatives of eq. (1), (2) and (4) shown in FIG. 3 for continuous gray level images:

$$s = F(x) = \int_0^x p_x(u) du \quad (1')$$

$$v = G(z) = \int_0^z p_z(w) dw \quad (2')$$

$$y = G^{-1}(s) = G^{-1}[F(x)] \quad (4')$$

In the case of continuous gray levels, the input histogram can be specified as exactly the same as the desired histogram. However, as aforementioned, for discrete gray levels only an approximation to the desired histogram can be achieved. Furthermore, as the number of the gray levels is approaching infinity, the approximation is approaching exact match. Therefore, in theory the smoothness procedure is equivalent to increasing the sampling rate during the discretization of the input histogram, and it outperforms the direct histogram specification between two histograms that have different bin size.

The smoothed histogram is just an intermediate step in this algorithm. There is not an image corresponding to it.

The following describes the process of Probability Mapping. Once the classical histogram specification algorithm has been applied to the smoothed histogram $p_x'(x)$ and the desired histogram $p_z(z)$, an intermediate LUT $y_k'=LUT_{inter}(x_k')$ is generated. The next problem is to choose the unique mapped value of $x_k$ from the multiple mapped values of its corresponding range $[x_k', x_k'+1, \ldots, x_k'+2^{(N-M)}-1]$. Exemplarily, two different criteria are proposed as criterion for probability mapping, as described in eq. (6) and (7) below:

$$y_k = \text{argmax}_{y_l'}\{p_z(y_l'), y_l'=LUT_{inter}(x_l'), x_l' \in [x_k', x_k'+1, \ldots, x_k'+2^{(N-M)}-1]\}, \quad (6)$$

$$y_k = \lfloor \text{mean}_{y_l'}\{p_z(y_l'), y_l'=LUT_{inter}(x_l'), x_l' \in [x_k', x_k'+1, \ldots, x_k'+2^{(N-M)}-1]\} \rfloor, \quad (7)$$

where $y_k$ is the mapped value of $x_k$. A final LUT $y_k=LUT_{final}(x_k)$, k=0, 1, . . . , $2^M-1$, $y_k \in \{z_l, l=0, 1, \ldots, 2^N-1\}$ is generated to map the original histogram to the desired histogram.

Eq. (6) says that among the $2^{N-M}$ values that $x_k$ corresponds to, we select the one that has the highest value in the desired histogram $p_z(y_l')$.

Eq. (7) says that among the $2^{N-M}$ values that $x_k$ corresponds to, we use the nearest integer less than or equal to their mean as the finally mapped value.

The $LUT_{inter}$ is a "one-to-one" mapping, because it maps the smoothed histogram of the input image to the histogram of the desired image. However, if we consider the straight histogram of the input image, we can see that each $x_k$ corresponds to $2^{N-M}$ values. The task of "Probability Mapping" is to choose only one value from the $2^{N-M}$ values as the finally mapped value of $x_k$. Hence, the $LUT_{final}$ is still a "one-to-one" mapping: it maps each value $x_k$ to a value $y_k$. The mapping of the LUT is invertible because only $2^M$ values of the total values ($2^N$) of the desired image have the corresponding $x_k$.

When the above-described algorithm is applied on an input image and a desired image, the histograms of both images are calculated. Then the input histogram is smoothed, resulting in the "smoothed histogram". After the remaining steps (classical histogram specification and probability mapping) are finished, a final LUT is generated to map the levels of the input histogram to the levels of that of the desired histogram. Then the predicted image is generated by applying the LUT to each pixel of the input image.

Figure 6:
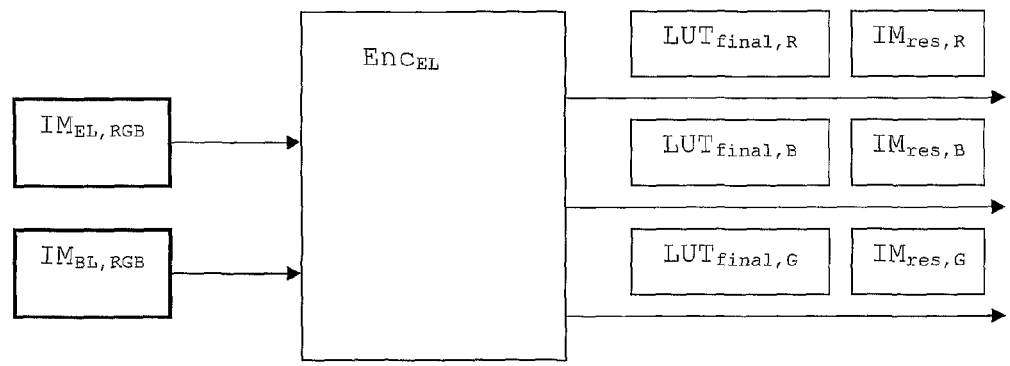
FIG. 6 an overview of a complete enhancement layer encoder.

FIG. 6 shows an overview of a complete enhancement layer encoder, with separate branches for R, G and B images. The base layer is conventionally encoded.

The invention is usable for video encoders and video decoders, and particularly for encoding/decoding a color base layer and a color enhancement layer of the same spatial resolution with optimized efficiency.

The invention claimed is:

1. A method for encoding a first video image consisting of RGB pixel values having M bit each and a second video image consisting of RGB pixel values having N bit each, with M<N, wherein the first and second video image have the same spatial resolution, and wherein the first video image represents a color base layer and the second video image represents a color enhancement layer of the color base layer, comprising:
generating a first transfer function having $2^N$ possible input values and being based on color histograms of the first and the second video image;
generating a second transfer function based on the first transfer function, wherein the second transfer function has $2^M$ possible input values and comprises a function for mapping each of its input values to one out of $2^{(N-M)}$ corresponding values of the first transfer function;
applying the second transfer function to the first video image, wherein the second transfer function is used for mapping the pixels, and wherein a transformed first video image is generated;
calculating the difference between the transformed first video image and the second video image;
encoding the difference;
encoding the first video image; and
transmitting the encoded first video image, the second transfer function and the encoded difference,
wherein the generating a first transfer function comprises:
generating a first color histogram of a reconstructed first image, the first color histogram having $2^M$ bins;
generating a second color histogram of the second image, the second color histogram having $2^N$ bins; and
generating from the first color histogram a smoothed color histogram having $2^N$ bins, wherein the values of each bin of the first histogram are distributed to $2^{(N-M)}$ bins, and wherein the first transfer function defines a transfer between the smoothed color histogram and the second color histogram.

2. The method according to claim 1, further comprising, initially:
encoding the first video image; and
decoding the encoded first video image to obtain a reconstructed first video image, wherein the applying the second transfer function refers to the reconstructed first video image.

3. The method according to claim 1, wherein the function for mapping each of the input values of the second transfer function to one out of $2^{(N-M)}$ corresponding values of the first transfer function is a probability mapping function.

4. The method according to claim 3, wherein the probability mapping function selects for each of the $2^M$ values of the second transfer function one value from the $2^{N-M}$ corresponding values of the first transfer function, being the one that has the highest value in the second histogram.

5. The method according to claim 3, wherein the probability mapping function selects for each of the $2^M$ values of the second transfer function one value from the $2^{N-M}$ corresponding values of the first transfer function, being the one that is the nearest integer less than or equal to the mean value of said $2^{N-M}$ corresponding values.

6. A method for decoding a first and a second video image received in a bitstream, wherein the first and the second video image have the same spatial resolution, and wherein the first video image represents a color base layer and the second video image represents a color enhancement layer of the color base layer, comprising:
extracting from the bitstream video data for the first and the second video image, and color enhancement control data;
decoding and reconstructing the first video image, wherein a reconstructed first video image is obtained having color pixel values with M bit each;
constructing a mapping table having three separate mapping table areas from the color enhancement control data, or constructing three separate mapping tables from the color enhancement control data, wherein each of the separate mapping tables or mapping table areas relates to one of the colors red, green and blue;
applying the mapping table or mapping tables to the pixels of the reconstructed first video image, wherein a transformed first video image is generated having a different color histogram than the reconstructed first video image;
decoding the second video image, wherein the second video image comprises pixel difference values; and
adding the decoded second video image to the transformed first video image, wherein a reconstructed second video image is obtained having color pixel values with N bit each, with M<N.

7. The method according to claim 6, wherein the transformed first video image has color histograms for red, green or blue that differ from the respective color histograms of the reconstructed first video image.

8. An apparatus for encoding a first video image consisting of RGB pixel values having M bit each and a second video image consisting of RGB pixel values having N bit each, with M<N, wherein the first and second video image have the same spatial resolution, and wherein the first video image represents a color base layer and the second video image represents a color enhancement layer of the color base layer, comprising an encoder configured to:
generate a first color histogram of a reconstructed first image, the first color histogram having $2^M$ bins;
generate a second color histogram of the second image, the second color histogram having $2^N$ bins;
generate from the first color histogram a smoothed color histogram having $2^N$ bins, wherein the values of each bin of the first color histogram are distributed to $2^{(N-M)}$ bins;
generate a first transfer function having $2^N$ possible input values and being based on color histograms of the first and the second video image, wherein the first transfer function defines a transfer between the smoothed color histogram and the second color histogram;
generate a second transfer function based on the first transfer function, wherein the second transfer function has $2^M$ possible input values and comprises a function for mapping each of its input values to one out of $2^{(N-M)}$ corresponding values of the first transfer function;
apply the second transfer function to the first video image, wherein the second transfer function is used for mapping the pixels, and wherein a transformed first video image is generated;
calculate the difference between the transformed first video image and the second video image;
encode the difference;
encode the first video image; and
transmit the encoded first video image, the second transfer function and the encoded difference.

9. An apparatus for decoding a first and a second video image received in a bitstream, wherein the first and the second video image have the same spatial resolution, and wherein the first video image represents a color base layer and the second video image represents a color enhancement layer of the color base layer, comprising an decoder configured to:

extract from the bitstream video data for the first and the second video image, and color enhancement control data;

decode and reconstruct the first video image, wherein a reconstructed first video image is obtained having color pixel values with M bit each;

construct a mapping table having three separate mapping table areas from the color enhancement control data, or construct three separate mapping tables from the color enhancement control data, wherein each of the separate mapping tables or mapping table areas relates to one of the colors red, green and blue;

apply the mapping table or mapping tables to the pixels of the reconstructed first video image, wherein a transformed first video image is generated having a different color histogram than the reconstructed first video image;

decode the second video image, wherein the second video image comprises pixel difference values; and add the decoded second video image to the transformed first video image, wherein a reconstructed second video image is obtained having color pixel values with N bit each, with M<N.

10. The method according to claim 1, wherein M is at least 2.

11. The method according to claim 6, wherein M is at least 2.

12. The apparatus according to claim 8, wherein M is at least 2.

13. The apparatus according to claim 9, wherein M is at least 2.

* * * * *